(No Model.) 2 Sheets—Sheet 1.
J. W. COOPER.
CAR BRAKE.
No. 500,250. Patented June 27, 1893.
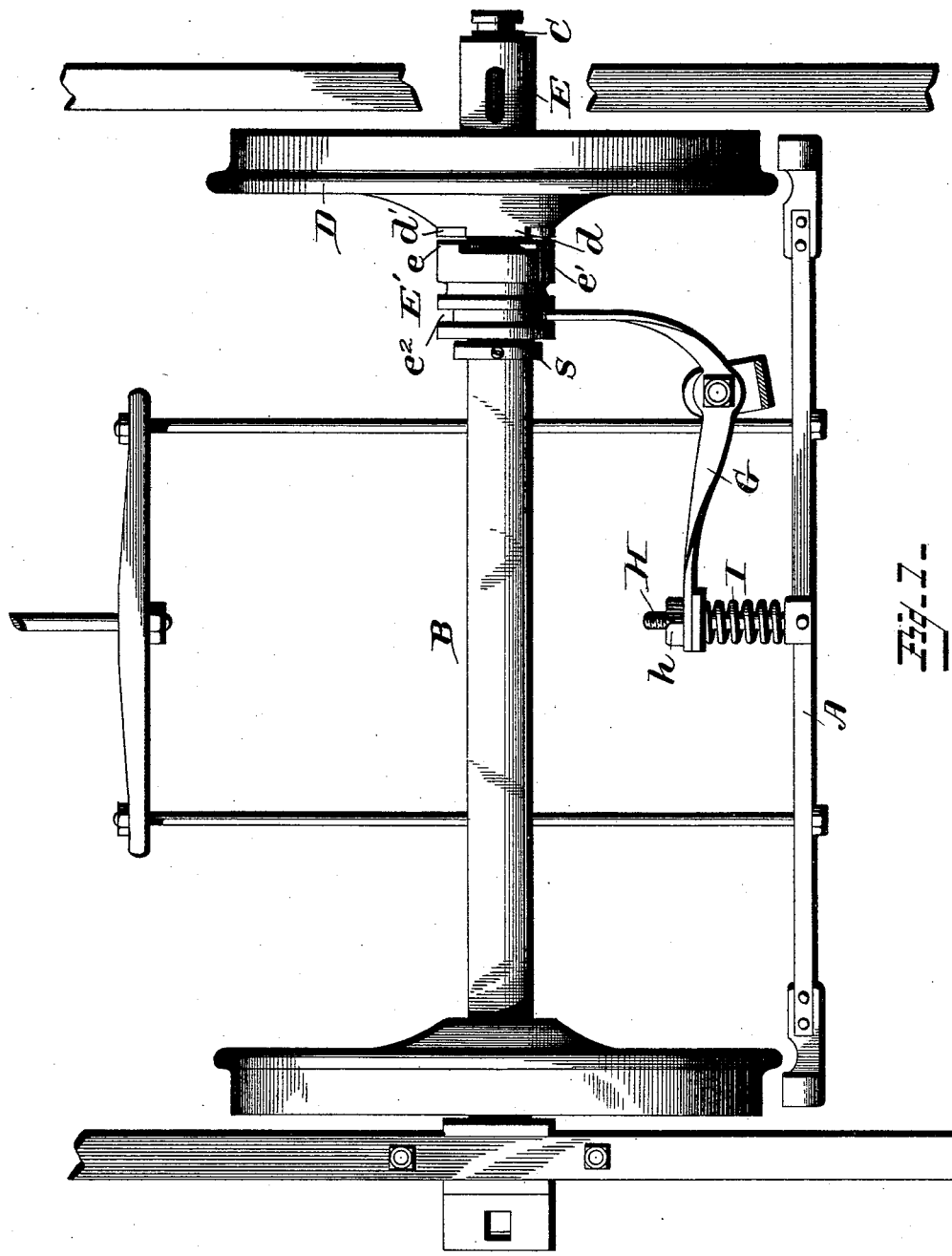
Witnesses,
E. V. Barnett.
Van Buren Hillyard.
Inventor
John W. Cooper.
By Attorneys R. S. & A. P. Lacey (No Model.)  2 Sheets—Sheet 2.
J. W. COOPER.
CAR BRAKE.
No. 500,250. Patented June 27, 1893.
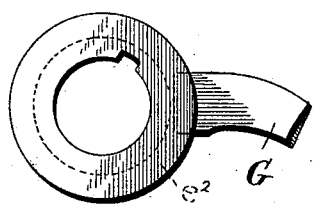
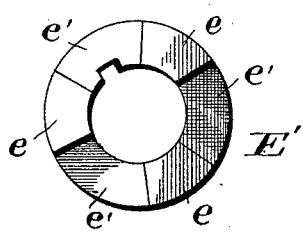
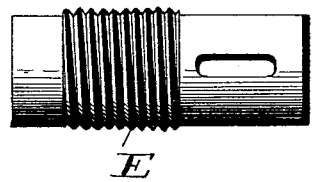
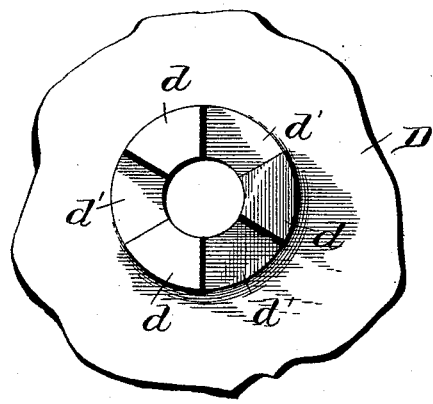
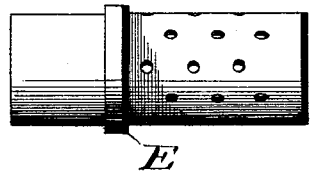
Witnesses.
E. V. Barnett.
Van Buren Hillyard.
Inventor
John W. Cooper.
By Attorneys R. S. & A. P. Lacey

UNITED STATES PATENT OFFICE.

JOHN W. COOPER, OF MATAWAN, NEW JERSEY.

CAR-BRAKE.

SPECIFICATION forming part of Letters Patent No. 500,250, dated June 27, 1893.

Application filed November 3, 1892. Serial No. 450,857. (No model.)

*To all whom it may concern:*

Be it known that I, JOHN W. COOPER, a citizen of the United States, residing at Matawan, in the county of Monmouth, State of New Jersey, have invented certain new and useful Improvements in Clutch Mechanism for Loose Car-Wheels; and I do hereby declare the following to be a full, clear, and exact description of the invention, such as will enable others skilled in the art to which it appertains to make and use the same.

The object of the present invention is to simultaneously clamp a loose car wheel to its axle and apply the brakes, and provide simple and efficient mechanism for successfully effecting the desired result.

A further purpose of the invention is to enable the application of the brakes to said loose wheel and during this interval prevent the rotation of said loose wheel on its spindle.

The improvement consists of a clutch mechanism between the brake operating devices and the loose wheel whereby when it is desired to apply the brakes and initial movement the brake operating mechanism will effect through said clutch mechanism a binding of the loose wheel to the axle, whereby said loose wheel and axle will be caused to revolve together, and whereby a continued movement of the said brake operating device will effect an application of the brakes.

The improvement further consists of the novel features and the peculiar construction and combination of the parts which will be hereinafter more fully described and claimed and which are shown in the annexed drawings, in which—

Figure 1 is a detail plan view showing the application of the invention. Fig. 2 is a detail view of the movable clutch sleeve on the axle and the lever which is in engagement therewith. Fig. 3 is a detail view of that end of the axle on which the loose wheel is mounted. Fig. 4 is a detail view of the detachable hub which is designed to be rigidly secured to the wheel. Fig. 5 is a detail view of a modified form of the hub. Fig. 6 is an end view of the clutch sleeve as seen from the side provided with the interlocking projections or teeth. Fig. 7 is a detail view of the opposing side of the wheel showing corresponding teeth or lugs.

The brake beam A is of ordinary construction and arrangement and is operated by and connected with a brake mechanism of well known construction. The axle B is provided at one end with a tight wheel which is attached thereto in the usual fashion, and is provided at its opposite end with a spindle C on which is mounted a loose wheel D in such a manner as to turn freely on said spindle C. The sleeve or bearing E may be attached to the wheel D in any desired manner, either by being provided with thread to be screwed therein, as shown in Fig. 4, or by being plain and pressed therein as shown in Fig. 5. The outer portion of the sleeve or bearing may be slotted or provided with a series of perforations as shown in Figs. 4 and 5, to permit the passage of lubricant to the spindle C from the journal box by any of the well known forms of oil feeding devices. The loose wheel D is provided on its inner face with a half clutch which is formed by a series of segmental teeth or projections $d$ which are separated by corresponding shaped spaces $d'$. The clutch sleeve E' mounted on the axle so as to move thereon to and from the wheel D and held from rotating independently thereon by a feather and spline connection or similar contrivance, is provided on the side facing the wheel D with a corresponding half clutch, the same consisting of projections or teeth $d$ which correspond with the spaces $e'$, and with intervening spaces $d'$ to receive the teeth $e$. The teeth $e$ are of slightly less length than the spaces $d'$ and the spaces $e'$ are slightly greater than the length of the teeth $d$, thereby admitting of a slight play between the corresponding parts of the clutch when the two are in engagement. By this means of construction the parts of the clutch will be prevented from riding past one another and engagement of the same secured when the brake mechanism is actuated to apply the brakes. The collar S secured on the axle limits the outward movement of the clutch sleeve E'.

The clutch operating lever G is pivotally supported between its ends to a suitable bracket which is attached to the truck frame. One end of the clutch operating lever enters an annular groove $e^2$ in the clutch sleeve E' and its opposite end is apertured to receive a rod H which is connected with the brake beam A. The outer end of the rod H is threaded to receive an adjusting nut *h* by means of which the tension of a spring I is regulated. This spring I is mounted on the rod H and is interposed between the brake beam A and the clutch operating lever G.

Under normal conditions the wheel D is adapted to revolve loosely on the axle B so that on rounding a curve the loose and tight wheel on the same axle may revolve at unequal rates of speed without causing any slipping or unnecessary friction between the wheels and the curved rails.

When it is desired to apply the brakes the brake actuating device is operated to cause an advancement of the brake beam A toward the wheels so as to bring the brake shoes in engagement therewith. This movement of the brake beam will effect a turning of the clutch operating lever G so as to bring the clutch sleeve E' in engagement with the clutch on the wheel D and cause said wheel to revolve with the axle. Should the teeth *e* and *d* be directly opposite when the lever G is actuated the spring I will be compressed and the instant the teeth come opposite the spaces between the teeth of the corresponding parts of the clutch, the clutch will engage and lock the wheel and axle together. If it were not for the yielding connection between the lever G and the brake beam A some of the operating parts would be strained and broken on actuating the brake mechanism at the instant the teeth *e* and *d* are in apposition. By having the teeth of the half clutches of a less length than the distance between the teeth of the corresponding parts, said parts will readily engage when the teeth come opposite the spaces. The brakes will be released in the usual manner by a suitable spring, and the brake beam A moving away from the wheel will disengage the clutch sleeve E' from the wheel D and leave the same to revolve freely on its spindle.

Having thus described my invention, what I claim, and desire to secure by Letters Patent, is—

1. In a running gear the combination with the axle having a loose wheel mounted thereon, and a brake mechanism to be applied to said wheel, of a clutch, mechanism adapted to be actuated from said brake mechanism to lock the wheel and axle together prior to the application of the brakes, substantially as set forth.

2. In a running gear the combination with the axle having the tight wheel at one end and a wheel loosely mounted on the opposite end, of a brake mechanism for said wheels, and a clutch mechanism interposed and actuated by said brake mechanism to lock the loose wheel to the axle an instant before the application of the brakes, substantially as described.

3. The combination of an axle, a wheel loosely mounted on said axle, a clutch to lock the wheel and axle together, a brake beam, and a clutch operating lever having one end constructed to actuate the said clutch and having its opposite end actuated from said brake wheel, substantially as set forth.

4. The combination of an axle, a wheel loosely mounted thereon, a clutch to lock the loose wheel and axle together, a brake beam, the clutch operating lever having one end in engagement with said clutch and a yielding connection between said brake beam and the clutch operating lever, substantially as and for the purpose set forth.

In testimony whereof I affix my signature in presence of two witnesses.

JOHN W. COOPER.

Witnesses:
FRANK P. McDERMOTT,
DANIEL E. PATTERSON.